United States Patent [19]

Petersen et al.

[11] Patent Number: 4,731,579

[45] Date of Patent: Mar. 15, 1988

[54] MAGNETIC POSITION INDICATOR AND ACTUATOR USING SAME

[75] Inventors: Christian C. Petersen, Westwood; Bernard C. Westgate, Jr., Bradford, both of Mass.

[73] Assignee: Polaroid Corporation, Cambridge, Mass.

[21] Appl. No.: 433,468

[22] Filed: Oct. 12, 1982

[51] Int. Cl.<sup>4</sup> .................. G01B 7/14; H01L 43/06; G03B 9/08

[52] U.S. Cl. .................. 324/207; 324/226; 324/262; 354/234.1; 354/235.1; 338/32 H

[58] Field of Search ............. 324/207, 208, 232, 234, 324/228, 235, 246, 226, 225, 227, 251, 262; 354/234, 235; 310/12–14; 318/135, 687; 335/205; 338/32 H, 32 R; 323/368

[56] References Cited

U.S. PATENT DOCUMENTS

| | | | |
|---|---|---|---|
| 3,041,416 | 6/1962 | Kuhrt | 324/251 X |
| 3,199,630 | 8/1965 | Engel et al. | 187/29 |
| 3,329,833 | 7/1967 | Dorsch | 307/88.5 |
| 3,344,347 | 9/1967 | Stevens | 324/45 |
| 3,473,109 | 10/1969 | Maaz et al. | 324/208 |
| 4,086,533 | 4/1978 | Ricouard et al. | 324/208 |
| 4,209,158 | 5/1980 | Ricouard et al. | 324/208 |
| 4,317,624 | 3/1982 | Shenk | 354/139 |
| 4,318,038 | 3/1982 | Munchiro | 318/135 |
| 4,325,614 | 4/1982 | Grimes | 354/23 D |
| 4,361,805 | 11/1982 | Narimatsu et al. | 338/32 R X |
| 4,401,944 | 8/1983 | Narimatsu et al. | 324/207 |
| 4,403,515 | 9/1983 | Iwasaki | 324/207 X |

FOREIGN PATENT DOCUMENTS

| | | | |
|---|---|---|---|
| 217549 | 3/1961 | Austria | 324/208 |
| 1537362 | 8/1968 | France | 324/208 |
| 45-27191 | 9/1970 | Japan | 324/207 |

Primary Examiner—Reinhard J. Eisenzopf
Assistant Examiner—Warren S. Edmonds
Attorney, Agent, or Firm—Leslie J. Payne

[57] ABSTRACT

The present invention relates to an improved position monitoring system for use in monitoring the positional relationship of two members mounted for relative movement with respect to each other. In such apparatus, a pair of magnetic fields are juxtaposed to each other such that they have opposite polarity and are of such a field strength that they provide for a generally linear variation in field strength extending over an elongated path which traverses the abutment of said fields. In a preferred embodiment, such a system is employed as an integral part of an electromagnetic actuator wherein the magnetic fields interact with the electromagnetic fields of a suitably positioned field coil. The monitoring is used to provide closed loop control of the positional relationship between the two members.

1 Claim, 4 Drawing Figures

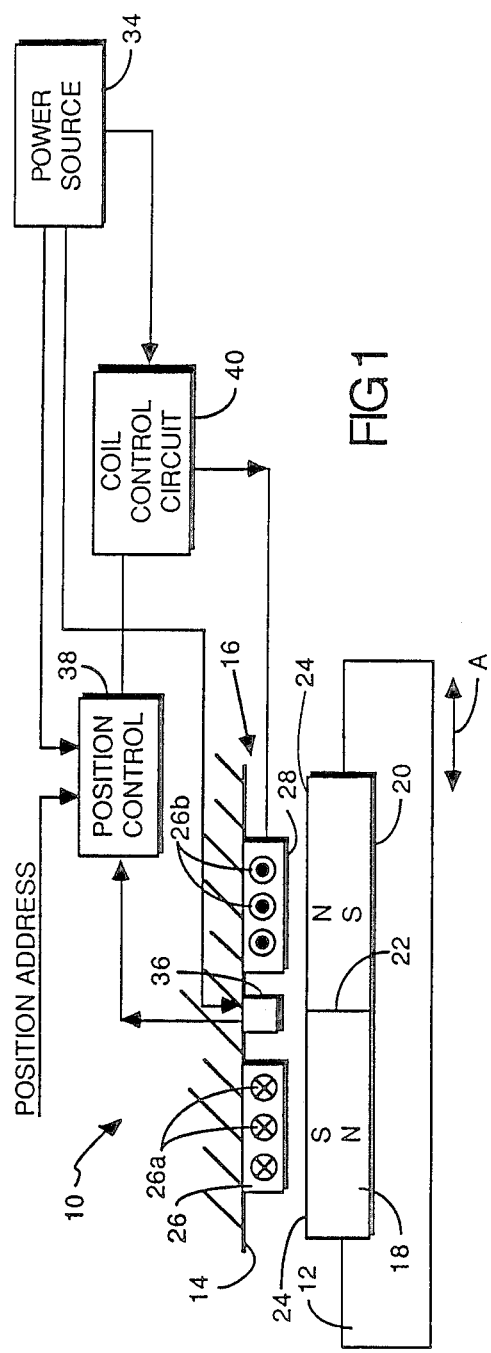
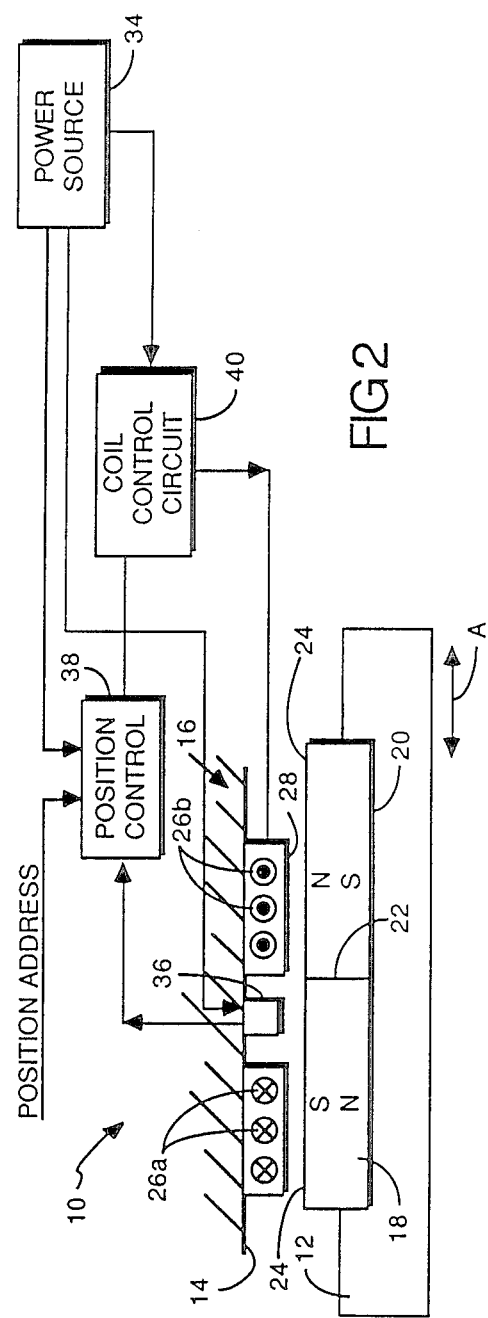

MAGNETIC POSITION INDICATOR AND ACTUATOR USING SAME

BACKGROUND OF THE INVENTION

This invention relates broadly to position monitoring apparatus and, in particular, monitoring apparatus having a magnetic sensing system which system serves simultaneously as part of the operative components of a controllable electromagnetic actuator.

Many kinds of position monitoring devices are well-known. Typically, these indicate the relative position of a moving object or provide for accurate position control of relatively movable objects by translating motion of the moving object into a feedback signal for closed-loop control of the moving object. It is also well-known to use magnetic sensing systems for such devices. A rather common magnetic monitoring system utilizes the Hall effect. To take advantage of the Hall effect, use is made of a Hall probe or generator, whose output voltage is proportional to the product of the current passing through it and the magnetic field perpendicular to it.

An example of a position monitoring device utilizing a magnetic sensor of the Hall type is disclosed in U.S. Pat. No. 3,199,630. As described, a Hall voltage generator is mounted on one of two relatively movable members so as to be in a fixed spaced relationship to a single permanent magnet carried by one of these members. When the Hall generator is used to sense or indicate a preselected position, the Hall voltage reaches a predetermined maximum value so as to indicate that the permanent magnet is aligned with the Hall generator. Also disclosed is an arrangement, wherein the magnetic sensing device is used in a controller. In such arrangement, the Hall generator has its Hall voltage at zero when the generator is positioned over the middle of a flat magnet. Displacement of the probe in a given direction from a location before the middle to a position beyond the middle will cause the voltage polarity to change and for a very limited displacement this change in voltage will be linear. The approach used for positioning relies upon the Hall probe reaching a null position for indicating accurate positioning. U.S. Pat. No. 3,344,347 is exemplary of another position monitoring system using a magnetic sensing device of the Hall type. This approach teaches the use of a Hall probe for monitoring an arcuate magnetic field produced by a single conductor. Although the monitoring is disclosed as useful for control purposes because of a linearity in the Hall voltage, such linearity is limited by the size of the conductor.

Besides the foregoing drawbacks, none of the known position monitoring devices of the Hall type form an integral part of a drive system for driving relatively movable members.

SUMMARY OF THE INVENTION

It is an object of the present invention to provide a monitoring apparatus employing a magnetic monitoring system. In one illustrated embodiment, there is provided a position monitoring apparatus comprising first and second members mounted for relative movement to each other along a given path. One member includes at least a permanent magnetic arrangement being coupled thereto, and having a pair having a magnetic fields extending in a direction generally transverse to the direction of relative movement along the given path. Each one of the fields has a polarity opposite to that of the adjacent field, each of the permanent mangets having a predetermined shape, size and field strength such that when each is in a preselected juxtaposed relationship to the other, the magnetic fields have a substantially linear field strength relationship as a function of distance along a portion of the combined dimension of the magnets, taken along the given path, which portion encompasses both magnetic fields. Included is means coupled to the other member and operable for sensing the magnetic field strength along said portion for providing an output signal representative of the field strength.

In a preferred embodiment, each permanent magnet has a surface from which its field extends. These surfaces are in abutting relationship and are generally coplanar and the field strengths are substantially equal.

In another preferred embodiment, the pair of permanent magnets form part of an electromagnetic actuator operable for driving the relatively movable members with respect to each other. Also, in such embodiment, the juxtaposed permanent magnets have a common juncture therebetween of substantially zero magnetic flux density.

Among the objects of the present invention are, therefore, the provision of a position monitoring apparatus including an improved magnetic sensing device; the provision of an improved apparatus for accurately positioning a first member relative to a second member along a given path and/or indicating position of one of the two relatively movable members; the provision of an improved magnetic sensing device inclusive of a pair of adjacent permanent magnetic fields of opposite polarity having magnetic flux density being substantially linear over a portion of their combined dimensions along the given paths; and the provision of an improved position control apparatus utilizing permanent magnets of the monitoring device as a part of an electromagnetic actuator operable for driving the first and second members relative to each other and for providing closed-loop control of the movement.

Other objects and further scope of applicability of the present invention will become apparent from the detailed description to follow taken in conjunction with the accompanying drawings wherein like parts are indicated by like reference numerals throughout the several views.

BRIEF DESCRIPTION OF THE DRAWINGS

FIG. 1 is a schematic diagram of the position responsive monitoring apparatus made in accordance with the principles of the present invention showing the relative position of the members during one mode of operation;

FIG. 2 is a schematic diagram of the apparatus of FIG. 1, but illustrating the components in a different relative position;

DETAILED DESCRIPTION

Figure 2A:
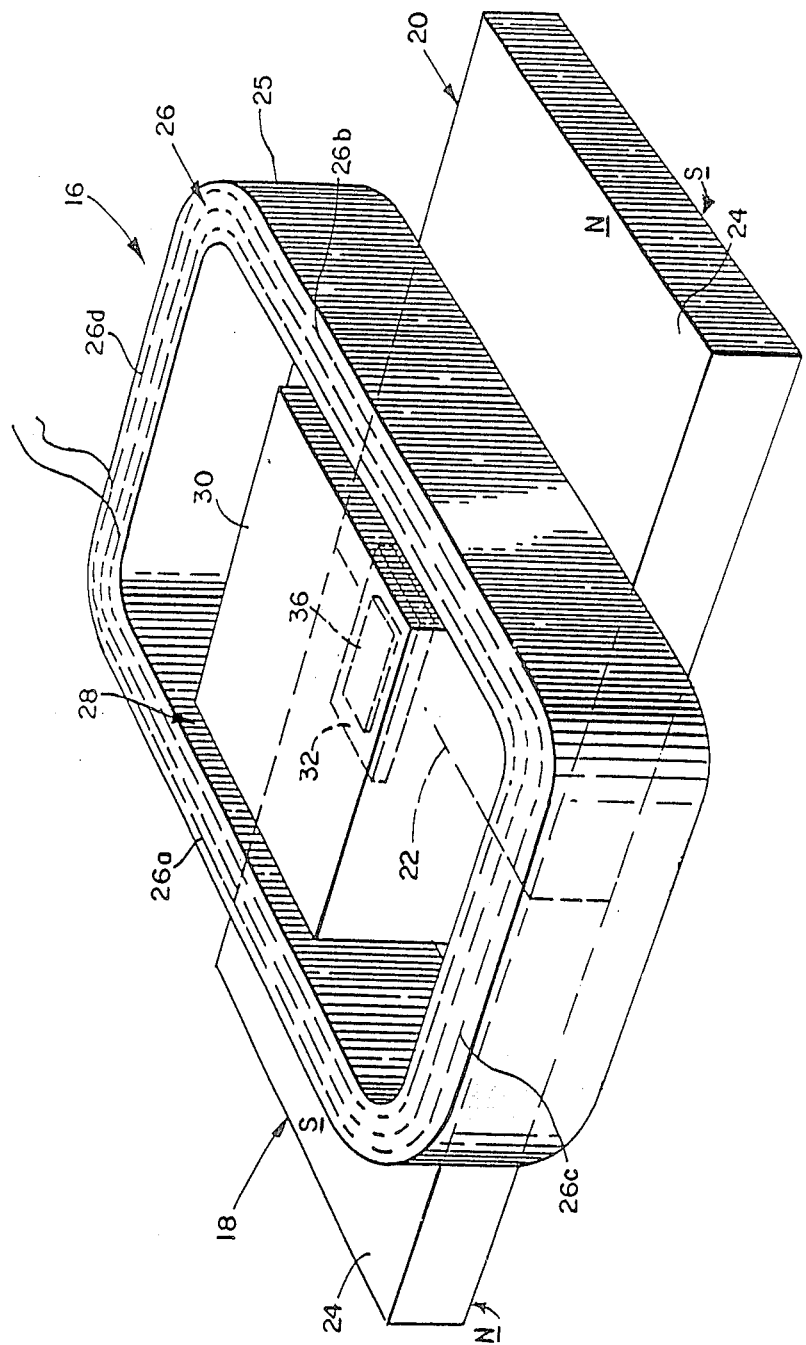
FIG. 2A is a schematic perspective view showing parts of the apparatus of the present invention; and, FIG. 3 is a graph illustrating the magnetic flux density generated by a pair of juxtaposed coplanar permanent magnets.

Reference is now made to FIGS. 1 and 2 for showing the improved position monitoring apparatus 10 made in accordance with the present invention. In the illustrated embodiment, the position monitoring apparatus 10 is specifically adapted for use in controlling the positioning and displacement of a movable member 12. The movable member 12 is mounted for movement relative to a stationary member 14 along a generally linear path indicated by arrows A. The movable member 12 can be any suitable output device or driver for a workpiece (not shown). For instance, the movable member 12 might be a programmable shutter.

The position monitoring apparatus 10 includes a sensing arrangement 16 of the magnetic type. Included in the magnetic sensing arrangement 16 is a pair of juxtaposed permanent magnets 18 and 20 carried on a common surface of the movable member 12. Both the permanent magnets 18 and 20 are, preferably, of the rare earth type, such as samarium cobalt. In the illustrated embodiment both the permanent magnets 18 and 20 are generally thin, flat and have a generally rectangular configuration. Both the magnets 18, 20 abut each other along a common juncture 22. In accordance with the present invention, each of the permanent magnets has its exposed surface 24 coplanar with the adjacent exposed surface. The magnetic polarity of these adjacent surfaces is opposite to each other. For purposes of illustration only, the exposed surface 24 of the permanent magnet 18 has a south polar S magnetization with its field extending therefrom generally perpendicular to the given path A. The exposed surface of the permanent magnet 20 has a north polar N magnetization with its field extending generally perpendicular to the given path A. The significance of these juxtaposed and opposed magnetic fields will be described subsequently. It will be appreciated that the permanent magnets 18, 20 define means or a magnetic arrangement for generating juxtaposed permanent magnetic fields of opposite polarity. Also, the field strengths of these magnets are selected to be sufficient to generate Hall voltages with sufficient strength to be useful for control purposes and have substantially equal field strengths.

With continued reference to FIGS. 1, 2 and 2A, there is schematically shown a generally planar coil assembly 26 having generally parallel and opposed longitudinal winding portions 26a, 26b extending generally parallel to the juncture 22. The winding portions 26a,b extend, respectively, through the magnetic fields created by the permanent magnets 18, 20. Also, the coil assembly 26 has winding portions 26c, 26d which bridge the longitudinal portions 26a, 26b as shown in FIG. 2A and are positioned outside the combined fields of the permanent magnets 18, 20. Preferably, the winding portions 26a–d are encased in a suitable plastic jacket, generally indicated by reference numeral 28. When energized with current having a given polarity, the coil portions 26a, 26b will have the current flowing therethrough in opposite directions. For illustration purposes, reference is again made to FIGS. 1 and 2 wherein the coil winding portions 26a are shown having current flowing from the plane of the paper and indicated by the symbol ".". The current flowing through coil 26b has the current flowing into the plane of the paper and indicated by the symbol "x". It will be appreciated that the direction of the current flowing through the coil windings 26a,b may be reversed. With current flowing through the coil windings 26a,b, there are created electromagnetic fields. As will be explained, these fields interact with the magnetic fields of the permanent magnets 18, 20 to displace the movable member 12 relative to the stationary member 14. The current polarity will determine the direction of movable member displacement, and the amplitude will determine speed.

Also included in the magnetic sensing arrangement 16 is a magnetic sensing and control circuit 30 (FIG. 2A) which is affixed to the stationary member 14 so as to be centrally disposed with respect to the coil assembly 26. Physically, the magnetic sensing and control circuit 30 can be embodied in a single integrated circuit (IC) chip 32 (FIG. 2). As is apparent, this arrangement yields a highly compact construction which enhances greatly the miniaturization of a controller. For ease in illustrating the present invention, the components of the control circuit 30 with the exception of the Hall transducer are not shown disposed between the winding portions. Power for the magnetic sensing and control circuit 30 is supplied from, preferably, a direct current (DC) power source 34.

Included in the integrated circuit chip 32 is a Hall effect transducer or sensor 36 which has a reference current supplied thereto from the power source 34. Not only does the power source 34 energize the Hall effect sensor 36, but also the coil assembly 26. In this embodiment, the Hall effect sensor 36, as shown in FIG. 1, is normally at a rest condition when it is stationarily disposed above the juncture 22. For accuracy, the Hall sensor 36 has a uniform gap spacing above the permanent magnets 18, 20 during translation relative to the latter. It will be understood the Hall effect sensor 36 is mounted so that the lines of magnetic flux cut the sensor generally perpendicular to the plane of control current flow through the sensor. Thus, the Hall effect sensor 36 will be effective in producing a Hall voltage as the sensor relatively scans the magnetic fields defined by the permanent magnets 18, 20. Although in this embodiment the Hall effect sensor 36 is operated on a constant DC current basis, it will be appreciated, however, that the sensor may be operated on a DC voltage basis. Since the Hall effect sensor 36 is operated on a constant DC current source, the resulting Hall voltage or output signal provided by the sensor is directly proportional to the perpendicular magnetic field strengths defined by the magnets 18 and 20. It will be recognized then that the Hall effect sensor 36 can be used to monitor the position and/or displacement of the movable member 12.

The integrated circuit chip 32 also includes a position control unit 38. The control unit 38 may include an amplifier (not shown) which is inputted by the Hall effect sensor 36. In turn, the amplifier's output provides an input to an analog comparator device (not shown). The comparator device compares the Hall signal from the sensor 36 with a position address signal. The latter is generated by a suitable controller (not shown) which is of the type that is operable for facilitating control over the positioning and displacement of the movable member 12. Operatively connected to the position control unit 38 is a coil control circuit 40. The coil control circuit 40 is responsive to the output signal of the position control unit 38 for controlling the supply of current from the power supply source 34 to the coil assembly 26. The Hall effect sensor 36 generates a signal, representative of a particular position the sensor is at in relationship to the magnets 18, 20. When this position signal matches the command address signal directed to the position control unit 38, a null condition arises. This null condition is effective to operate the coil control circuit 40 so that current to the coil assembly 26 is discontinued. Hence, the coil assembly 26 will no longer be effective for purposes of driving the movable member 12. The coil control circuit 40 will proportionally control the amount of current to the coil assembly 26 in accordance with the difference between the sensed Hall signal from the Hall effect sensor 36 and the address command signal.

Returning back to the permanent magnets 18, 20, each is basically identical with the other and they are oriented so as to be, preferably, in an abutting coplanar relationship with respect to each other. See FIGS. 1–2A. A surprising and unexpected relationship occurs with respect to the magnetic field strengths of the adjacent permanent magnets 18, 20. In this regard, it has been determined that there is a significant linearity between magnetic field strengths of the magnets in relationship to a significant given portion of the lineal distance along the given path A, which portion encompasses generally equal distances on both sides of the common juncture 22.

Figure 3:
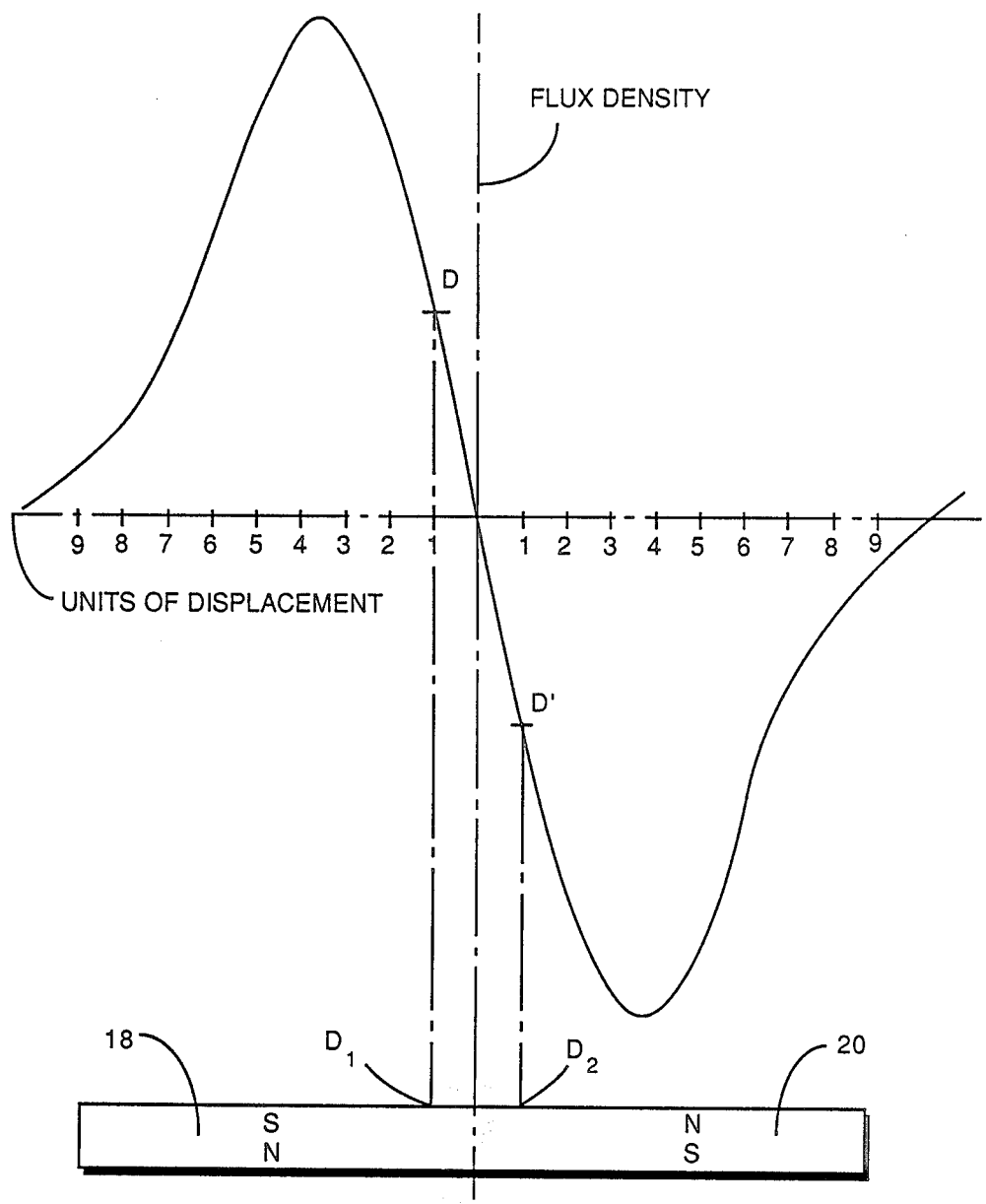

Reference is made to FIG. 3 for showing the combined magnetic field strengths of the permanent magnets 18, 20. The graph of FIG. 3 shows the flux density of the magnets, as measured in gauss, as a function of the linear distance of the magnets along path A.

As illustrated in FIG. 3, a solid-line curve B is representative of the flux densities or magnetic field strengths of the permanent magnets 18, 20 when a predetermined gap exists between the Hall effect sensor 36 and the coplanar outer surfaces 24. By observing curve B, a number of significant and surprising features have been determined by having the magnets in an adjoining relationship as shown in the drawings. As observed, there is a significant degree of linearity in the flux densities generated by the combined fields of the permanent magnets when arranged in such a fashion. In this regard, the curve B has a substantial linearity of flux densities extending from point D to point D'. The linearity between points D and D' enables use thereof for easily controlling the member 12 anywhere between such points. The points D, D' on curve B correspond respectively to the points $D_1$, $D_2$ on the permanent magnets 18, 20. It is pointed out that the curve B was generated by a pair of samarium cobalt magnets having the following dimensions: 0.090" width; 0.050" depth; 0.175" length. The amplitudes of the flux density for the curve B are due to the gap spacing between the Hall effect sensor 35 and the surfaces 24. For curve B the gap was 0.005". It will be understood that the amplitudes of the flux densities will decrease with increased gap spacing. Also, it will be appreciated that although there might, in fact, be slight deviations in exact linearity between the noted points, such deviations are negligible and can be relatively easily accommodated by the position control unit 38 to correct for such deviations. The extent of the noted linearity in flux density can be varied in accordance with a number of factors; such as the size of the permanent magnets.

It has also been determined that the flux density along the juncture 22 is zero despite variations in gap spacing. This fact of zero flux density can be particularly advantageous for use in position control mechanisms because it provides a convenient reference point.

Advantageously, the relatively extended linearity of flux density or field strengths resulting by placing the magnets 18, 20, as described provides a significant improvement over known magnetic sensing arrangements making use of a Hall effect sensor.

It is believed that the operation of the present invention is apparent from the foregoing description. To supplement such description, however, a brief description of its operation will follow. Assume it is desired to displace the movable member 12 rightwardly from the rest position shown in FIG. 1 to a new position along path A, i.e., anywhere between points $D_1$, $D_2$. The new position could correspond to position D'. For this to occur, an appropriate position address signal voltage is fed to the comparator of the position control unit 38 which voltage corresponds to the voltage that will be generated by the Hall effect sensor 36 when at the position D'. Simultaneously, the coil assembly 26 is energized with current from the power source 34. As noted, current will travel through the winding portions 26a,b in the manner indicated in the drawings. The resulting interaction between the opposing magnetic fields of the permanent magnets 18, 20 and the electromagnetic fields of the winding portions 26a,b cause movement of the movable member 12 in the desired rightward direction shown in FIG. 2. Of course, for the movable member 12 to travel in the opposite direction the coil control unit 38 would reverse the polarity of current through the coil windings 26a,b. During translation of the movable member 12, the Hall effect sensor 36 will monitor the flux density as it scans over the surface 24. To operate more successfully, the Hall effect sensor 36 should encompass a relatively small area in relationship to the fields generated by the magnets 18, 20. In this manner, the sensor 36 will more accurately monitor the flux density at any given point along the magnets 18, 20. When the sensed Hall voltage reaches a value corresponding to the voltage of the desired position address signal, a null condition is reached. This will be effective to operate the coil control circuit 40 so as to cut off the flow of current to the coil assembly 26. Of course, this has the effect of stopping the driving force on the member 12. It will be understood that as the movable member 12 approaches the desired position, the difference between the sensed Hall voltage and the position address voltage will progressively diminish. The result of this will be that the voltage supplied to the coil assembly 26 by the coil control circuit 40 will be proportionally diminished. It will be appreciated that in dynamic systems of the kind just described, there is a tendency for the movable member 12, as a result of momentum, to move beyond the desired position. It will be understood that the present invention contemplates that other conventional control system approaches may be used to decelerate the movable member 12 so that such momentum is compensated for and thereby provide accurate position control.

It is pointed out that the present invention is not necessarily concerned with the type or sophistication of the control system used. Rather, the present invention is concerned with providing not only an improved magnetic sensing arrangement which can be used for control purposes, but also wherein such sensing arrangement is an integral part of an electromagnetic actuator which may be used for control purposes.

Although in the present embodiment, the coplanar permanent magnets 18, 20 are shown in an abutting relationship, the present invention contemplates that the permanent magnets need not be actually abutting, but may indeed have a very narrow preselected spacing therebetween. Also, while the permanent magnets 18, 20 are shown with uniform thickness, it is to be understood that the permanent magnets may have other cross-sectional thickness. However, whatever other configurations and spacings are selected though, these should be such as to produce, in substantial respects, the noted linearity of flux density versus distance as outlined above.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. An actuator apparatus for controlling the relative positions of a pair of members, one of which is movable relative to the other along a given path, said apparatus comprising:

magnetic means forming at least a portion of a first of said members for providing adjoining magnetic fields of opposite polarity and generally equal field strengths extending generally perpendicular to said given path for providing a substantially linear variation in field strength extending over an elongated path which traverses an abutment of said fields;

a field coil forming at least a portion of a second of said members, said field coil having conductive portions located in said fields, and said field coil portions being energizeable for effecting relative movement between said members along said given path;

means for sensing magnetic field strength fixedly coupled to said second member and generally centrally located within said field coil for movement along said elongated path responsive to relative movement of said members whereby said sensing means provides a substantially linear response during said relative movement, said sensing means providing an output signal representative of magnetic field strength; and, means responsive to said output signal for controlling the energization of said field coil to provide closed loop control of the positioning of said members.

* * * * *